June 8, 1965 J. D. CANNS ETAL 3,187,628
THREE MIRROR VEHICLE SAFETY DEVICE FOR
LATERAL AND REAR VIEWING
Filed Nov. 1, 1961
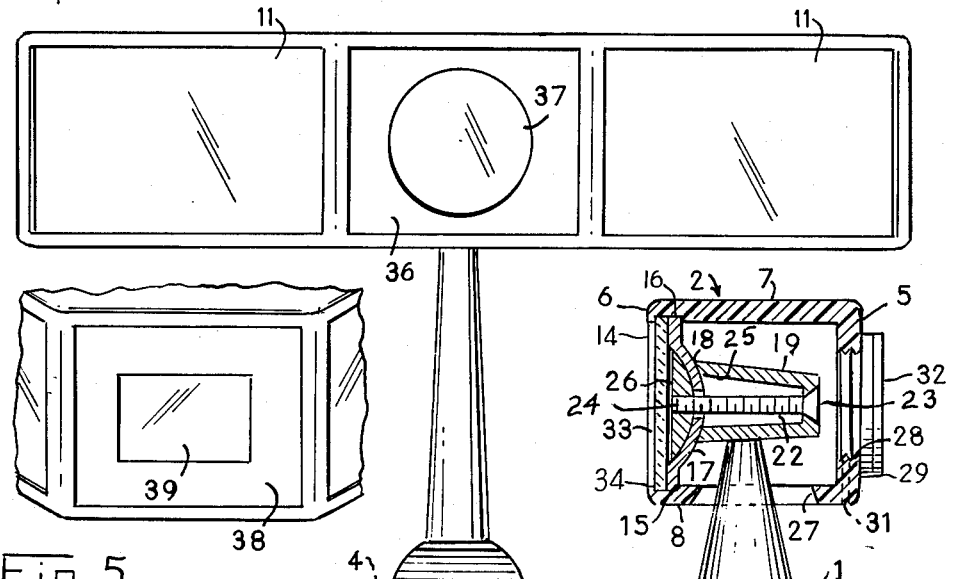
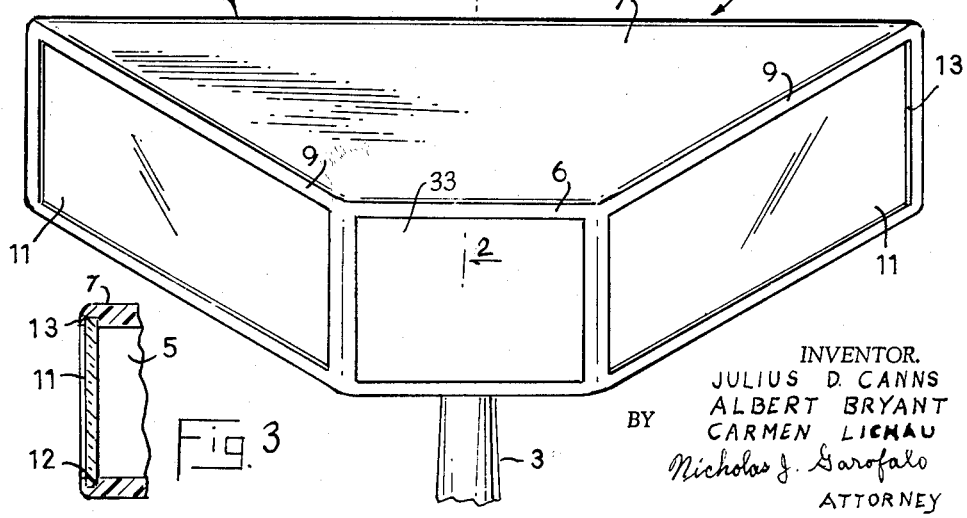
INVENTOR.
JULIUS D. CANNS
ALBERT BRYANT
CARMEN LICHAU
BY Nicholas J. Garofalo
ATTORNEY United States Patent Office 3,187,628
Patented June 8, 1965

3,187,628
THREE MIRROR VEHICLE SAFETY DEVICE FOR LATERAL AND REAR VIEWING
Julius D. Canns, 148—20 Liberty Ave., Jamaica, N.Y.; Albert Bryant, Hollis, N.Y. (148—20 Liberty Ave., Jamaica, N.Y.); and Carmen Lichau, 205 Albany Ave., Brooklyn, N.Y.
Filed Nov. 1, 1961, Ser. No. 149,420
2 Claims. (Cl. 88—86)

This invention is directed to a viewing and reflecting accessory mountable upon an automobile forwardly of the driver.

An object of the invention is to provide for an automobile an accessory which will materially aid in safeguarding the automobile from colliding with other vehicles or objects.

Another object of the invention is to provide a practical and economical device for the foregoing purpose.

A still further object of this invention is to provide a viewing and reflecting accessory for an automobile which alerts and makes the driver aware of the perils of objects moving toward his vehicle from various directions; and which also alerts the drivers of oncoming passing vehicles of the approach of the automobile on which the device is mounted.

The device is of particular advantage when it is mounted as far forwardly as possible upon the front left fender of an automobile. When it is so mounted, a pair of mirrors at opposite ends of the device and converging rearwardly toward one another serve to reflect to the driver objects at the right and left of the front end of his automobile. This arrangement enables the driver to see in the mirrors the reflections of vehicles moving in the crossroads of an intersection as his own automobile enters the intersection and before it crosses the latter. A light reflector mounted at the rear of the device serves at night to reflect the light beams of vehicles rearwardly of the driver, and thus warns the driver of the fact of vehicles following at his rear. A light reflector mounted at the front of the devise serves at night to reflect to the drivers of oncoming vehicles the light beams from their own headlamps, and thus serves as a warning and a guide for such oncoming vehicles in passing clear of the automobile on which the device is mounted.

The invention further lies in the particular combination and arrangement of its component parts whereby the benefits and safety features provided by the invention are obtained.

The foregoing and other objects and advantages of the invention will appear more fully herein from a consideration of the detailed description which follows, taken together with the accompanying drawing wherein an embodiment of the invention is illustrated. It is to be expressly understood, however, that the drawing is for purposes of illustration and description, and it is not to be construed as defining the limits of the invention.

In the drawing:

FIG. 1 is a rear perspective view of a viewing and reflecting automobile accessory embodying the invention, the lower portion of the supporting bracket being broken away;

FIG. 2 is a cross section taken on line 2—2 of FIG. 1;

FIG. 3 is a fragmentary cross section through one of the end mirrors;

FIG. 4 is a rear elevational view of a modified form of the invention; and

FIG. 5 is a fragmentary perspective view from the rear of a further modified form of the invention.

Attention is directed to the several figures of the drawings, and now especially in FIGS. 1 to 3, wherein is disclosed a viewing and reflecting automobile accessory or device 1. It comprises a main body or housing 2 supported by a bracket 3 which is adapted to be mounted to the exterior of an automobile. The device is intended to be mounted on the automobile forwardly of the driver, and preferably on a forward area of the front left fender, the fender being indicated in the drawing by the broken line 4.

The housing 2 is shown here as being tubular and of plastic construction. It has front, rear, top, and bottom walls, respectively designated by the numerals 5, 6, 7, and 8. The end walls 9 of the housing are cut on the bias at an angle to the front and rear walls, convergingly rearwardly. Mounted in opposite ends of the housing in parallel relation to the end walls 9 is a pair of mirrors 11. To accommodate the mirrors, each end wall 9 is recessed uniformly so as to provide a continuous internal shoulder 12. Each mirror is closely fitted in one of the recessed ends in a vertical plane, and is seated against the shoulder 12. A slight lip 13 about the inner edge of each end wall 9 abuts the adjacent mirror and retains the latter fast in the housing. The angle of disposition of the mirrors to the rear wall 6 is substantially 60 degrees, inasmuch as favorable results are obtainable by this structural arrangement in the use of the device. The function of the end mirrors is to reflect objects that are opposite to the ends of the device, so that these objects may be seen in the mirrors by a person positioned rearwardly of the device.

The rear wall 6 is uniformly recessed about a central opening 14 so as to provide a continuous internal shoulder 15. Closely fitted within this opening and seated against the shoulder is a swivel bracket plate 16, by means of which the housing 2 is swivelly mounted to the bracket 3. To this end, there is formed centrally of the forward face of the bracket plate a convexed protuberance 17 which is swivelly seated in a complementary concaved end wall 18 of a barrel member 19 of the bracket. The latter member 19 is unitary with the upper end of a stem portion 21 of the bracket; and it extends transversely of the interior of the housing. The swivel plate is retained to the barrel member by means of an adjustable screw 22. A head end 23 of the screw seats in a cavity at the end of the barrel member. A shank portion 24 of the screw extends freely through a coned recess 25 in the barrel member, passes through a hole centrally of the swivel plate, and threadedly engages a nut 26 seated in an outer concaved face of the swivel plate. When the screw is tightened in the nut, the swivel plate as well as the housing are restrained against swivel movement relative to the barrel member. When the screw is slightly loosened, the swivel plate and the housing as a unit may be adjustably swiveled about the barrel member to a desired position. To permit free movement of the housing in this respect, the barrel member is disposed in the housing clear of the interior upper, bottom and front walls of the housing; and the upper end of the stem 21 extends freely through an enlarged opening 27 formed in the bottom wall of the housing.

A circular opening 28 is provided centrally of the front wall 5 of the housing, through which a screwdriver may be entered to adjust the screw 22.

A light reflector button 29 is threadedly screwed into this opening. A lock-screw 31 holds the button fast to the housing. As a safeguard against vandals who may attempt to dismantle the housing from the bracket, the lock-screw is threadedly extended into the housing from the underside thereof, where it will not be readily discovered or quickly loosened. The button includes on its front face a colored light reflector element 32.

A second light reflector member 33 is located at the rear of the housing. It is closely fitted in the opening 14, and is seated against the bracket plate 16. A slight lip 34 about the outer edge of the opening 14 abuts the adjacent reflector member 33 and holds the latter fast in the housing.

The end mirrors 11 are intended to reflect to the driver of the automobile on which the device is mounted, vehicles and objects approaching from the driver's right and left. The colored light reflector 33 which may be of amber color. This colored reflector 33 shines brightly at night when light falls on it from the beams of the headlamps of vehicles following rearwardly of the automobile on which the device is mounted, and thus alerts and warns the driver that there are vehicles following him. And the colored light reflector 32 at the front of the device, which reflector may also be of amber color, shines brightly at night when light falls on it from the beams of the headlamps of oncoming vehicles, and thereby alerts and warns these oncoming drivers of the position and approach of the automobile on which the device is mounted.

In use, the device is preferably mounted on the upper surface of the left front fender 4 of an automobile, this being at the driver's side and forwardly of the driver. The device is preferably located as far forwardly as possible on the fender. The bracket 3 includes a base portion 35 which is mountable on the fender by means of suitable fasteners, such as nuts and bolts 36. The device is arranged so that the housing 2 thereof is in a substantially horizontal plane extending transversely of the fender. The housing may be swivelly adjusted on the bracket so as to present to the driver the best possible view of images appearing in the end mirrors. By arranging the device in the foregoing manner, the driver is able to cautiously nose his vehicle into dangerous or "blind" intersections, and thereby obtain before crossing the intersection a view in the end mirrors 11 of vehicles and other objects moving in the crossroads at his right and left. The colored reflector 32 at the front end of the device when made bright by the lights of oncoming vehicles serves as a guide to the drivers of the latter, enabling them to pass clear of the automobile on which the device is mounted. The advantages of the colored reflector 33 at the rear of the device have been mentioned earlier herein.

In FIG. 4 there is shown a further form of the invention, which is in all respects the same as the form shown in FIGS. 1-3, except that the rear reflector member 36 has a circular mirror 37 centrally thereof. The mirror 37 serves the function of a rear view mirror for the driver, while the surrounding reflector member 36 serves the function of the colored reflector member 33 shown in FIG. 1.

In FIG. 5 there is shown a fragmentary view of a further modified form of the invention. This form is the same as the form shown in FIGS. 1-3, except that the rear reflector member 38 has centrally thereof a rectangular mirror 39, the functions of the mirror 39 and the surrounding reflector 38 being the same as those of the mirror 37 and the colored reflector 36 in FIG. 4.

While the reflector elements 32, 33, 36, and 38 are here formed of conventional colored light reflecting glass; it is understood that they may be formed of plastic, fluorescent tape, paint, or other colored light reflecting material. The housing 1 is here shown as being of plastic material and is rectilinear in cross section. It is, nevertheless, understood that it may be formed of other materials, and it may be of other shapes.

While an embodiment of the invention has been illustrated and described in detail, it is understood that the invention is not limited thereto. Various changes can be made in the design and arrangement of its parts without departing from the spirit and scope of the invention; and it is our intent therefore, to claim the invention not only as shown and described, but also in all such forms and modifications thereof as may be reasonably construed to be within the spirit of the invention and the scope of the appended claims.

What we claim is:

1. In a motor vehicle having a front fender disposed at a side of the vehicle forwardly of the driver, a mirror reflector safety device for reflecting simultaneously to the driver the presence of vehicles approaching forwardly from his rear as well as vehicles approaching laterally from opposite sides of his vehicle comprising a bracket mounted at its base end upon the surface of the fender proximate the front end thereof having an upright stem, an elongated housing disposed in a horizontal plane transversely of the fender and of the upper end of the stem having a bottom wall providing a central aperture through which the upper end of the stem extends with a surrounding clearance into the interior of the housing, means entirely within the interior of the housing mounting the housing to the upper end of the stem for limited swivel adjustment of the position of the housing about its longitudinal and lateral axes, the housing further having parallel front and rear walls centered relative to one another wherein the front wall is substantially longer than the rear wall and the rear wall faces rearwardly of the vehicle, a pair of mirrors each defining an end wall of the housing declining rearwardly from a corresponding end of the front wall to a corresponding end of the rear wall so that vehicles approaching laterally from opposite ends of the device and sides of the vehicle are reflected by the mirrors to the driver, and the rear wall of the housing being faced with a mirror whereby vehicles approaching forwardly from the rear of the device are also reflected to the driver.

2. A mirror reflector safety device as defined in claim 1, wherein the front wall of the housing includes an aperture providing access of a tool to the means mounting the housing to the upper end of the stem, and a button having a light reflecting outer face removably closes over the aperture, whereby the driver is alerted by the several mirrors of the housing of the approach of vehicles from his rear and from opposite sides, and the light reflecting outer face serves to alert on-coming vehicles of the driver's vehicle, thus guarding the driver of the vehicle carrying the mirror reflector safety device simultaneously from attendant dangers in all directions.

References Cited by the Examiner

UNITED STATES PATENTS

| 1,622,958 | 3/27 | McLean | 88—78 |
| 1,928,876 | 10/33 | Bergander | 88—81 |
| 2,161,777 | 6/39 | Sarnes. | |
| 2,198,082 | 4/40 | Harty | 88—78 |
| 2,533,475 | 12/50 | Koonter. | |
| 2,845,000 | 7/58 | Morley | 88—98 |
| 2,914,988 | 12/59 | O'Shei | 88—98 |
| 3,005,385 | 10/61 | Meade et al. | 88—98 |

FOREIGN PATENTS

| 32,362 | 6/27 | France. |
| | | (1st add. to Pat. No. 617,959) |
| 938,772 | 2/56 | Germany. |
| 312,816 | 6/29 | Great Britain. |

JEWELL H. PEDERSEN, *Primary Examiner*.
JULIA E. COINER, *Examiner*.